United States Patent
Ferrari et al.

(10) Patent No.: US 11,456,593 B2
(45) Date of Patent: Sep. 27, 2022

(54) BATTERY PROTECTION CIRCUIT

(71) Applicant: ZF Automotive UK Limited, Solihull (GB)

(72) Inventors: Leonardo Ferrari, Balsall Common (GB); Naiwu Yuan, Birmingham (GB); Mansoor Shah, Derby (GB)

(73) Assignee: ZF AUTOMOTIVE UK LIMITED, Solihull (GB)

( * ) Notice: Subject to any disclaimer, the term of this patent is extended or adjusted under 35 U.S.C. 154(b) by 273 days.

(21) Appl. No.: 16/815,051

(22) Filed: Mar. 11, 2020

(65) Prior Publication Data
US 2020/0303918 A1 Sep. 24, 2020

(51) Int. Cl.
H02H 7/18 (2006.01)
H02H 11/00 (2006.01)
H01G 9/00 (2006.01)
H01G 11/16 (2013.01)

(52) U.S. Cl.
CPC ............ *H02H 7/18* (2013.01); *H02H 11/002* (2013.01); *H01G 9/0003* (2013.01); *H01G 11/16* (2013.01)

(58) Field of Classification Search
CPC ......... H02H 7/18; H01G 9/0003; H01G 11/16
See application file for complete search history.

(56) References Cited

U.S. PATENT DOCUMENTS

| | | | |
|---|---|---|---|
| 2012/0169274 A1* | 7/2012 | Thomsen | H02H 3/20 361/91.1 |
| 2020/0059085 A1* | 2/2020 | Kolli | H02P 27/06 |

FOREIGN PATENT DOCUMENTS

| | | | | |
|---|---|---|---|---|
| CN | 202474830 U | * | 10/2012 | ........... H02H 11/003 |
| CN | 203787976 U | * | 8/2014 | |
| DE | 3618500 A1 | * | 12/1987 | ........... H02H 11/002 |
| EP | 0259845 | | 3/1988 | |
| KR | 20160114408 A | * | 3/2015 | ............... H02H 7/18 |

* cited by examiner

Primary Examiner — Harry R Behm
(74) Attorney, Agent, or Firm — Tarolli, Sundheim, Covell & Tummino LLP

(57) ABSTRACT

A battery protection circuit has two input nodes and two output nodes. The input nodes are connected to a positive supply line and a negative or ground line respectively, and the two output nodes are connected to a positive side of a load and a negative or ground return side of the load. The circuit includes a solid state switch which is oriented such that when the switch is open current cannot flow from the battery through the load. At least one capacitor is connected in series with a diode between the two input nodes of the circuit to smooth out any negative transient voltages present at the positive input node of the circuit. The capacitor includes a polarized capacitor and the diode is oriented to protect the capacitor during normal use when a positive voltage is present at the input node that is connected to the positive supply line.

11 Claims, 1 Drawing Sheet

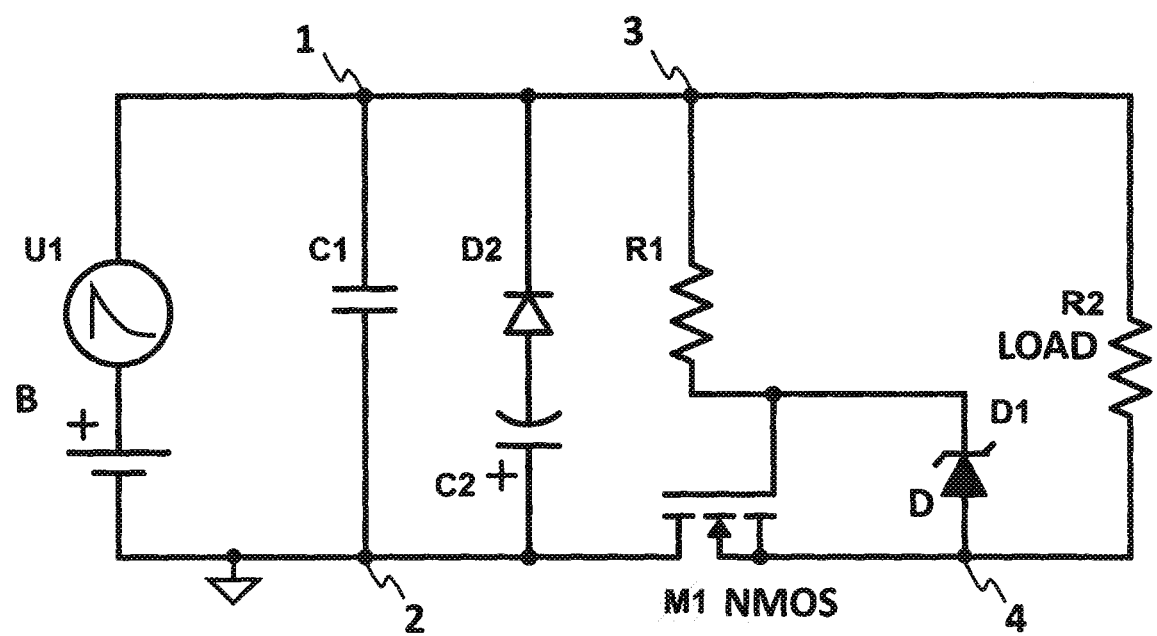

BATTERY PROTECTION CIRCUIT

RELATED APPLICATION

This application claims priority from British Application No. 1903746.4 filed Mar. 19, 2019, the subject matter of which is incorporated herein by reference in its entirety.

BACKGROUND OF THE INVENTION

This invention relates to a protection circuitry, in particular for protection of an automotive module from transients carried by a power supply to the module.

Conventional automotive electrical systems such as electric power steering take their power from a battery fitted to the vehicle. During maintenance of the vehicle it is possible to accidentally fit the battery with the polarity reversed. Unless steps are taken to protect against such an event, a reversed battery polarity can cause catastrophic failure of the electric circuits that draw power from the battery.

Automotive electrical supplies nominally provide a relatively low DC voltage from the battery, typically 12v or 24v or 48v. However, it is common for very high voltage transients to occur that may exceed ten times this nominal voltage, such as when an inductive load is suddenly disconnected from the circuit. A transient of −100v or more at the positive side of the battery is not uncommon and may be as high as −500v or more.

It is known to provide a battery protection circuit for connection between a battery and a protected load. In its simplest form the circuit may comprise a single diode connected in series between the positive supply side of the battery and the load that is being protected. The diode is oriented so that current can flow through this diode if the battery is connected correctly. If the battery polarity is reversed no current can flow through the diode and so the load is protected by the protection circuit. Although this works well in many cases, there is a voltage drop across the diode which may not be acceptable in all cases. The diode consumes power as a function of the product of the forward voltage drop and the current, and where the current is sizable there may be an unacceptable waste of power which creates heat.

In a more sophisticated arrangement that wastes less power, a reverse battery protection circuit may be provided having two input nodes for connection to respective sides of a battery, and two output nodes for connection to respective sides of the protected load, and a solid state switch which selectively connects one of the inputs to one of the outputs whereby when the switch is open current cannot flow from the battery through the protected load. The switch replaces the diode of the simple arrangement. The switch may comprise an N-channel MOSFET connected into the ground return path from the load to the negative side of the battery. The gate of the MOSFET may be connected to the positive side of the battery, perhaps through a load resistor, so that with the battery connected in the right polarity a positive voltage is applied to the gate to cause the MOSFET to close and allow current to flow along the return path. If the battery is connected with the wrong polarity the gate voltage will be negative and the switch will be in an open condition to stop current flowing along the ground return path.

To prevent damage to the MOSFET when a high transient voltage is present the MOSFET must be chosen with a high drain-source voltage rating. This makes the MOSFET expensive and makes the power loss across the MOSFET also high during use.

SUMMARY OF THE INVENTION

According to a first aspect the invention provides a battery protection circuit having two input nodes and two output nodes, the input nodes being connected to a positive supply line and a negative or ground line respectively, and the two output nodes being connected to a positive side of a load and a negative or ground return side of the load, in which the circuit includes a solid state switch which is oriented such that when the switch is open current cannot flow from the battery through the load, and in which the circuit further includes at least one capacitor connected in series with a diode between the two input nodes of the circuit to smooth out any negative transient voltages present at the positive input node of the circuit, the capacitor comprising a polarized capacitor and the diode being oriented to protect the capacitor during normal used when a positive voltage is present at the input node that is connected to the positive supply line.

The provision of the switch enables the circuit to be broken between the battery and the load to protect the load when a reverse battery connection is made whilst the provision of a bulk storage polarized capacitor in series with a diode between the two input nodes enables any transient voltages present at the input nodes to be smoothed out significantly, reducing the voltage that may be applied to the MOSFET drain source and allowing a lower power rated switch to be used. The diode ensures that the polarized capacitor is not reverse biased during normal use where a positive voltage is present at the positive input node which would otherwise destroy a polarized capacitor.

The switch may be provided in the ground return path of the circuit, which enables the switch when open to isolate the ground side of the load from the negative side of the battery.

The polarized capacitor may comprise an electrolytic capacitor or a super capacitor.

The polarized capacitor may comprise two or more individual polarized capacitors connected in series, or ideally only one polarized capacitor. Because polarized capacitors are relatively cheap for the amount of capacitance they provide compared with non-polarized capacitors it is possible to use one large capacitor even with a highly cost sensitive circuit such as reverse battery protection for an automotive application.

The circuit may further include one or more additional non-polarized capacitors connected in parallel with the capacitor. These may be ceramic capacitors, for example multi-layer ceramic capacitors. They may be metallic film capacitors. As these are not polarized they may be connected without any series diodes as they do not need any protection from a reverse battery polarity. The provision of these capacitors is beneficial in smoothing out ripple on the input nodes as they are active when the battery is connected the right way round or when the polarity is reversed.

Each of the capacitors may be connected to the input terminals at all times regardless of the switch being open or closed.

The switch may comprise a semiconductor MOSFET connected with the drain and source of the switch in series in the ground line and with the gate connected directly or indirectly to the positive input node. The source may be connected to the ground return output node and the drain to the ground return input node.

The MOSFET may comprise an N-channel MOSFET.

Alternatively, the switch may comprise a P-channel MOSFET connected in the positive supply line of the circuit to isolate the load from the positive input node and hence from the positive supply line.

One or more Zener Diodes may be connected in series between the gate and the source of the switch to clamp the gate-source voltage of the MOSFET. This ensures that a MOSFET with a low Gate-source voltage limit can be used without risk of damage. An additional resistor may be provided in series between the gate of the MOSFET and the positive input node to limit the current flowing through the Zener.

The circuit may be used in combination with a circuit in which the positive input node is connected to a positive terminal of a battery and the negative input node to a negative terminal of a battery. For the avoidance of doubt, the voltage present at either input node may be either positive or negative, in normal use the positive input node being presented with the positive voltage of the battery but from time to time being presented with a negative transient voltage such as may occur when an inductive load is removed from the battery.

BRIEF DESCRIPTION OF THE DRAWINGS

There will now be described, by way of example only, one embodiment of the present invention with reference to the accompanying drawings of which;

FIG. 1 shows an exemplary circuit in accordance with the invention connecting a load to a battery in a vehicle.

DESCRIPTION

As shown, a reverse battery protection circuit connects a battery B to a load R2. This may be part of an automotive electrical circuit, in which case the battery will typically be a 12 volt battery with a nominal voltage at the positive terminal of around 12-14 volts when fully charged.

The circuit has two input nodes 1, 2 and two output nodes 3, 4, the input nodes being connected to a positive side of the battery B and a negative or ground side of the battery. As shown these connect directly to the respective positive and negative terminals of the battery in this example. They may, of course, not connect directly to those terminals as the battery may be located at a remote position on the vehicle. As shown the load in the example is a purely resistive load, but in practice it could be an electronic control unit or an electric motor drive circuit or some other device. The negative side of the battery in this example is connected to an earth.

The circuit includes a solid state N-channel MOSFET switch M1 which selectively connects the negative output node 4 to the negative input node 2 to form a ground return line from the load R2 back to the battery B. During normal use, current flows from the battery B through the reverse battery protection circuit, through the load R2, and then back through the ground return path to the battery B. This requires the switch M1 to be closed (turned ON) during normal use to complete the ground return line. To protect the load from a reverse polarity connection of the battery, the circuit is configured to open the switch (turn OFF) to break the ground return line and prevent any current flowing to the load.

To achieve the desired operation of the switch M1, the drain and source of the switch M1 are connected to the ground return line and the gate is connected in such a way that a positive gate-source voltage VGS is applied when the battery is connected correctly and a negative gate-source voltage is applied when the battery polarity is reversed. As is well known, applying an appropriately high positive gate-source voltage to an N-channel MOSFET will cause the switch to close (turn ON) and conduct between source and drain. When a negative voltage is applied the switch will open (turn OFF) to protect the load R2.

The circuit also includes two capacitors C1, C2 that smooth out transients at the input nodes. One of these capacitors C1 is a multi-layer metallic capacitors (MLCC) and connects directly between the two input nodes.

The second capacitor C2 is a polarized bulk storage capacitor that is connected in series with a diode D2 between the two input nodes 1, 2 of the circuit. The series connected capacitor C2 and diode D2 are therefore in a parallel with the MLCC capacitor C1. The positive side, or anode, of the capacitor is connected to the ground or negative input node and the negative side of the capacitor C2 is connected through the diode D2 to the positive input terminal. The diode D2 is oriented with the cathode of the diode connected to the positive input terminal and the anode of the diode is connected to the negative side of the polarized capacitor C2.

The diode D2 is therefore oriented so that during normal use, with the battery connected with the correct polarity, no current can flow through the diode D2 into the polarized capacitor C2 from the positive terminal to the negative terminal. When the battery polarity is reversed, or a negative transient is present at the positive input node, current can flow through the capacitor and the diode. This allows the capacitor C2 to help reduce the magnitude of the transient applied across the drain-source of the switch M1 while protecting the capacitor C2 during normal use.

The circuit also includes a Zener diode D1 that is connected in series between the gate and the source of the OSFET and a burden resistor R1 is connected in series between the gate and the positive side of the battery. This arrangement of resistor and Zener diode allows the gate-source voltage to be clamped to a safe level—set by the properties of the Zener diode—to ensure that the MOSFET is not damaged when a high positive transient is present at the positive terminal.

The invention claimed is:

1. A battery protection circuit having two input nodes and two output nodes, the input nodes being connected to a positive supply line and a negative or ground line respectively to couple the input nodes to a battery, and the two output nodes being connected to a positive side of a load and a negative or ground return side of the load, in which the battery protection circuit includes a solid state switch which is configured such that when the switch is in an open state current cannot flow from the battery through the load, and in which the battery protection circuit further includes:

a first capacitor connected in series with a diode between the two input nodes of the circuit to smooth out negative transient voltages present at the positive input node of the circuit, the first capacitor comprising a polarised capacitor and the diode being oriented to protect the first capacitor during normal use when a positive voltage is present at the input node that is connected to the positive supply line; and a second capacitor connected in parallel with the first capacitor and between the two input nodes, wherein the first and second capacitors are connected to the input nodes during the open state and during a closed state of the solid state switch, wherein during the closed state the current flows from the battery through the load.

2. A battery protection circuit according to claim 1, in which the polarized capacitor comprises an electrolytic capacitor or a super capacitor.

3. A battery protection circuit according to claim 1 in which the polarized capacitor comprises two or more individual polarized capacitors connected in series.

4. A battery protection circuit according to claim 1, wherein the second capacitor corresponds to one or more additional non-polarised capacitors connected in parallel with the capacitor.

5. A battery protection circuit according to claim 4 in which the non-polarised capacitor is a ceramic capacitor or a metallic film capacitor.

6. A battery protection circuit according to claim 1 in which the solid state switch is provided in the ground return path of the circuit which enables the battery protection switch when open to isolate the ground side of the load from a negative terminal of the battery.

7. A battery protection circuit according to claim 6 in which the battery protection switch comprises a semiconductor MOSFET connected with the drain and source of the battery protection switch in series in the ground line and with the gate connected directly or indirectly to the positive input node.

8. A battery protection circuit according to claim 7 in which the battery protection switch comprises an N-channel MOSFET.

9. A battery protection circuit according to claim 1, wherein a first terminal of the first capacitor is coupled via the diode to a first input node of the two input nodes, and a second terminal of the first capacitor is connected to a second input node of the input nodes, and a first terminal of the second capacitor is connected to the first input node and a second terminal of the second capacitor is connected to the second input node.

10. A battery protection circuit according to claim 9, wherein the first input node is coupled to the positive line and the second input node is coupled to the negative or ground line.

11. A battery protection circuit according to claim 10, wherein a gate of the solid state switch is coupled via a resistor to the first input node.

* * * * *